United States Patent [19]

Kadokura et al.

[11] Patent Number: 4,507,364
[45] Date of Patent: Mar. 26, 1985

[54] PERPENDICULAR MAGNETIC RECORDING MEDIUM

[75] Inventors: Sadao Kadokura, Hachioji; Takashi Tomie, Hino; Masahiko Naoe, Tokyo, all of Japan

[73] Assignee: Teijin Limited, Osaka, Japan

[21] Appl. No.: 502,662

[22] Filed: Jul. 14, 1983

Related U.S. Application Data

[62] Division of Ser. No. 329,822, Dec. 11, 1981, Pat. No. 4,407,894.

[30] Foreign Application Priority Data

Dec. 12, 1980 [JP] Japan .................................. 55-174680

[51] Int. Cl.$^3$ ............................................ H01F 10/02
[52] U.S. Cl. .................................. 428/457; 428/694; 428/900
[58] Field of Search ................ 428/694, 457, 900; 427/127–132, 48

[56] References Cited

PUBLICATIONS

Iwasaki et al, IEEE Transactions on Magnetics, vol. MAG 15, No. 6, 11–79, pp. 1456–1458.
Iwasaki, IEEE Transactions on Magnetics, vol. MAG 16, No. 1, 1–80, pp. 71–76.
Iwasaki et al, IEEE Transactions on Magnetics, vol. MAG-14, No. 5, 7–78, pp. 849–851.

Primary Examiner—Bernard D. Pianalto
Attorney, Agent, or Firm—Burgess, Ryan & Wayne

[57] ABSTRACT

Magnetic recording medium conventionally utilizes the in-plane magnetization mode, but, recently, the perpendicular magnetization mode utilizing the perpendicular anisotropy of an hcp cobalt alloy layer, in which C axis is oriented normal to the layer surface, is proposed. The known perpendicular magnetic recording medium has been produced by an RF sputtering, but such medium is of too low flexibility to use it in the form of a magnetic tape. In addition, the production rate of the perpendicular magnetic recording medium by RF sputtering is very low.

The perpendicular magnetic recording medium is very flexible due to particle pattern (FIGS. 10, 12 and 13) completely distinct from the conventional columnar pattern (FIGS. 8 and 11). In addition, the production rate is high, because the base (20) is located beside a space between the targets ($T_1$, $T_2$) of a sputtering device and further the magnetic field is generated perpendicularly to the sputtering surfaces ($T_{1s}$, $T_{2s}$) by a field coil (32) or magnets (32, 33). The present invention makes it possible to commercially produce the perpendicular magnetic recording medium, especially in the tape form.

7 Claims, 17 Drawing Figures

PERPENDICULAR MAGNETIC RECORDING MEDIUM

This is division of application Ser. No. 329,822, filed Dec. 11, 1981 and issued on Oct. 4, 1983 as U.S. Pat. No. 4,407,894.

The present invention relates to a perpendicular magnetic recording medium of a cobalt alloy which comprises mainly cobalt and additionally chromium and a method for producing the same. More particularly, the present invention relates to a perpendicular magnetic recording medium having a novel pattern as seen through an electron microscope and to a method for producing the same. In addition, the present invention also relates to an improved sputtering device.

The present magnetic recording system fundamentally uses the longitudinal (in-plane) magnetization mode, that is, a magnetization being parallel to the base, to which the cobalt alloy layer is applied.

Iwasaki has proposed in IEEE Transactions on Magnetics, Vol. MAG-16, No. 1 January 1980, pp 71–76 a perpendicular magnetic recording system which theoretically makes it possible to produce a higher density recording than in the case of the longitudinal magnetization mode. In the perpendicular magnetic recording system, the magnetization perpendicular to the surface of the magnetic recording layer is used for the recording. Research, for example as shown in Japanese Laid Open Patent Application No. 52-134706 and Technical Reports MR80-43 and MR81-5 of the Institute of Electronics and Communication Engineers of Japan, has been energetically carried out in an attempt to commercially apply the perpendicular magnetic recording system and to elucidate the properties of a magnetic medium required for the magnetic recording devices.

The results elucidated by previous research regarding the properties of a magnetic layer necessary for perpendicular magnetic recording are now explained. The magnetic layer adapted to the perpendicular magnetization system should be an alloy layer mainly consisting of cobalt and additionally chromium and should have a magnetic anisotropy perpendicular to the layer surface. This magnetic anisotropy, i.e. perpendicular magnetic anisotropy, should usually have a relationship of $Hk \geq 4Ms$, wherein Hk and $4\pi Ms$ are the anisotropy field and the maximum demagnetizing field of a magnetic layer, respectively. This relationship designates that the magnetic layer possesses a satisfactorily high perpendicular anisotropy.

The perpendicular anisotropy may not have a relationship of $Hk \geq 4\pi Ms$ at any point on the magnetic layer if a particularly high density magnetic recording is to be achieved. Instead, a high saturation magnetization (Ms) is desired and, therefore, chromium is incorporated into cobalt in such an amount that a saturation magnetization (Ms) ranging from 200 to 800 emu/cc is ensured. The cobalt, which is the major component of the magnetic film, has an hcp (hexagonal closed packing) structure and a uniaxial magnetic anisotropy which makes possible a high anisotropy field. Such an anisotropy field is one of the properties necessary for perpendicular magnetic recording. A cobalt alloy layer, which has an hcp structure and a high perpendicular orientation to the layer surface (C-axis of the alloy is perpendicular to the layer surface), exhibits a satisfactorily high anisotropy field Hk. The perpendicular orientation mentioned above is evaluated by subjecting a magnetic film to X-ray diffraction, obtaining the rocking curve of the diffraction peak from the (002) plane of the hcp structure, and measuring the half value width or dispersion angle $\theta_{50}$ of the rocking curve. A half value width $\theta_{50}$ of 15° or less is alleged to be sufficient for excellent perpendicular anisotropy. The coercive force $H_{cv}$ in the perpendicular direction, which is more than 100 Oe (Oersted), is allegedly sufficient for an excellent perpendicular orientation.

It is reported in the Japanese Journal of Applied Physics Vol. 20, No. 7 and in the Technical Report of the Institute of Electronics and Communication Engineers of Japan MR81-5 that the above properties necessary for the perpendicular magnetic recording mode can be produced by a cobalt alloy layer in which from 15 to 25 atomic % of chromium is incorporated and that columnar stripe patterns, which can be detected at the fracture or cross section of the cobalt alloy layer and which elongate perpendicularly to the film surface, favourably exert an influence on shape anisotropy and play an important role in the perpendicular anisotropy of the cobalt alloy layer. According to the results of research carried out by the present inventors, however, the columnar stripe patterns are disadvantageous in the light of high internal stress and strain of the cobalt alloy layer. A disadvantageously large curl of the conventional perpendicular magnetic recording mediums could be attributed to the columnar stripe patterns, thus resulting in high internal stress and strain of such layers.

Conventional perpendicular magnetic recording mediums have been produced by an RF sputtering method (U.S. Pat. No. 4,210,946). Namely, cobalt alloy layer containing from 5 to 25 weight % of chromium is deposited on the base to a thickness of 1 micron by means of the RF sputtering method. However, the RF sputtering method, in which the target electrode and the base are disposed opposite to one another, cannot be applied in the case of large-scale production of or high-speed growth of perpendicular magnetic recording layers. The highest growth rate of cobalt alloy layer achieved at present by means of the RF sputtering method is about 500 Å per minute (The fourth meeting of the Japan Society for Applied Magnetism 1980, 60A-4). It is therefore desired that the growth rate be enhanced to such a degree as to make possible commercial production of perpendicular magnetic recording mediums. Furthermore, in the conventional method, the base is heated to provide the cobalt alloy layer, which grows on the base, with the columnar stripe patterns mentioned above. When the film is used as a base for a magnetic recording medium, such as in the case of a magnetic tape or a floppy disc, the material of which the disc is made is restricted to a heat-resistant macromolecular material. Such restriction hinders commercial application of the perpendicular magnetic recording medium.

It is an object of the present invention to provide a perpendicular magnetic recording medium which does not have the columnar stripe pattern but has a novel pattern and a homogenity drastically reducing the curl of a perpendicular magnetic recording medium and enhancing the flexibility of such medium.

It is another object of the present invention to provide a method for producing a perpendicular magnetic recording medium at such an enhanced rate of production as to make this method commercially applicable. The method provided should make it possible to use less expensive and a lower heat-resistant film, such as a polyethylene terephthalate film and a polyethylene-2,6 naphthalate film, as the base for the perpendicular magnetic recording medium.

It is yet another object of the present invention to provide a sputtering device which allows uniform and high-speed formation of a magnetic layer, particularly a perpendicular magnetic recording layer.

In accordance with the objects of the present invention, there is provided a perpendicular magnetic recording medium formed on a base and comprising an hcp cobalt alloy layer which comprises mainly cobalt and additionally chromium and which has a direction of easy magnetization in a direction normal to the base, characterized in that the cobalt alloy layer has particle pattern, as seen in a cross section of the layer observed with an electron microscope.

In accordance with the objects of the present invention, there is also provided a method for producing a perpendicular magnetic recording medium, wherein an hcp cobalt alloy layer which consists mainly of cobalt and additionally chromium and which has a direction of easy magnetization in a direction normal to the base is deposited on the base by means of a sputtering method, characterized in that a magnetic field is generated in a direction perpendicular to the surfaces of a pair of cathode targets arranged opposite to one another within a sputtring device, and the cobalt alloy is deposited on the base which is located beside a space between said pair of cathode targets and which faces said space.

In accordance with the objects of the invention, there is also provided a sputtering device, comprising:
  a vacuum vessel;
  a pair of oppositely arranged cathode targets in the vacuum vessel;
  a holder for a base, on which a film is deposited by the sputtering, said holder being located beside a space between the pair of the cathode targets and facing said space;
  a means for generating a magnetic field perpendicularly to the cathode targets; and,
  a power source for applying a negative bias voltage to the holder.

The embodiments of the present invention are hereinafter explained with reference to the drawings, wherein:

DETAILED DESCRIPTION OF THE DRAWINGS

Figure 1:
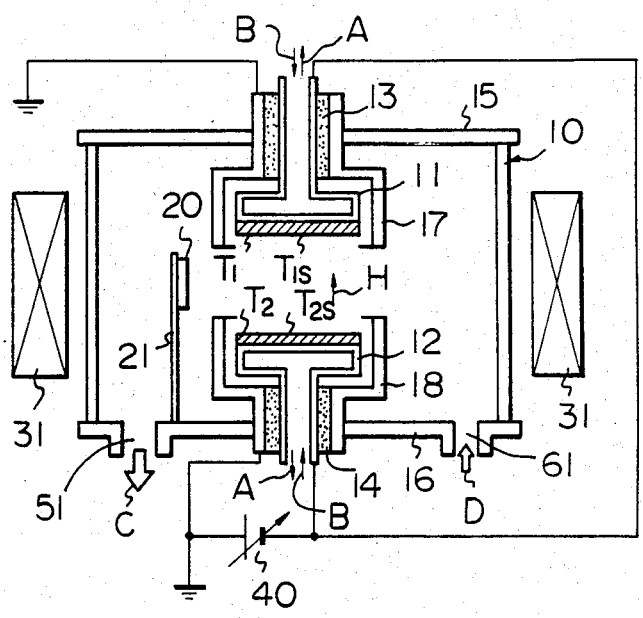
FIG. 1 is a partial cross-sectional view of a sputtering device used to implement the method of the present invention.

Referring to FIG. 1, a sputtering device with a pair of opposing cathode targets is illustrated. As described hereinabove, the conventional perpendicular magnetic recording mediums were produced by means of RF sputtering. The sputtering device with a pair of opposing cathode targets, used to prepare films made of ferromagnetic non-perpendicular-oriented materials such as iron and nickel, was recently reported by Naoe et al in the Journal of Crystal Growth, Vol. 45, pp 361-364, 1978.

The sputtering device with a pair of opposing targets, hereinafter simply referred to as the opposing target sputtering device, comprises a vacuum vessel 10 and a pair of cathode targets $T_1$, $T_2$ which are closely attached or secured to the target holders 11, 12. The cathode targets $T_1$, $T_2$, hereinafter referred to as the targets $T_1$, $T_2$, are arranged opposite to one another so that their surfaces, which are subjected to sputtering, i.e. the sputtering surfaces $T_{1S}$, $T_{2S}$, face one another via the space between the targets $T_1$ and $T_2$ and are parallel to one another. The distance between the targets $T_1$ and $T_2$ is preferably from 50 to 400 mm. The targets $T_1$, $T_2$, which are subjected to sputtering, are cooled by water, symbolized by the arrows A and B, which is admitted into the target holders 11, 12. The target holders 11, 12 are secured to the side plates 15, 16 of the vacuum vessel via the insulating members 13, 14. The target holders 11, 12 and the insulating members 13, 14 are protected by shields 17, 18 from plasma particles formed during sputtering so that abnormal electric discharge does not occur at the target holders and the insulating members.

The base 20, on which the perpendicular magnetic recording layer is to be formed by means of the sputtering method, is located on the base holder 21 disposed beside the targets $T_1$, $T_2$ so that the base 20 is located beside the space between the targets $T_1$, $T_2$ and faces this space. The distance between the base holder 21 and the ends of the targets $T_1$, $T_2$ is preferably 100 mm or less. The base 20 is usually positioned vertically.

The field coil 31 is a means for generating the magnetic field perpendicular to the sputtering surfaces $T_{1S}$, $T_{2S}$ and surrounds the outer periphery of the vacuum vessel 10. A direct current from a power source (not shown) is applied to the field coil 31. A sputtering power source is denoted by 40 and is a direct current source to which the targets $T_1$, $T_2$ and the shields 17, 18 are connected as a cathode and an anode, respectively. The vacuum vessel 10 is provided with gas exhausting port 51 which communicates with a gas exhausting system (not shown) and a gas introducing port 61 which communicates with a gas source (not shown) and its associated gas-introduction devices. The arrows C and D symbolize the flowing direction of the gas.

When operating the opposing target sputtering device described above, the gas exhausting device is preliminarily operated so as to satisfactorily withdraw the gas in the vacuum vessel 10 through the gas exhausting port 51 and, subsequently, a sputtering gas, such as an argon gas, is admitted into the vacuum vessel 10 so that the pressure in the vacuum vessel 10 is increased to a predetermined level, for example from $10^{-1}$ to $10^{-4}$ Torr. Then the field coil 31 is energized to generate the predetermined magnetic field H, and the sputtering power source 40 is energized to apply a predetermined power between the cathode and anode.

In the opposing target sputtering device shown in FIG. 1, the electric field and the magnetic field H are perpendicular to the sputtering surfaces $T_{1S}$, $T_{2S}$. Due to the layout and configuration of the targets $T_1$, $T_2$, the electrons can be confined in the space between the targets $T_1$, $T_2$ while the metals sputtered from either of the targets $T_1$, $T_2$ repeatedly collide with the opposite target and the energy of the metals is reduced during the repeated collisions. The metals, whose energy is reduced as just stated, do not seem to deposit on the base 20 solely due to the energy thereof; rather, the formation of perpendicular magnetic recording layer seems to result mainly due to diffusion of the metals from the space between the targets $T_1$, $T_2$ toward the base 20. In other words, a high density plasma is formed in the space between the targets $T_1$, $T_2$ so that diffusion of the metals, which metals are possibly metal ions, can be realized. It is believed that high-speed growth of the perpendicular magnetic recording layer can be achieved by confinement of the electrons or the high density plasma. Since the base 20 is offset from the targets $T_1$, $T_2$, heat generation due to the impinging effects of the electrons on the base 20 is not appreciable and therefore perpendicular magnetic recording film can be formed at a low temperature.

Figure 2:
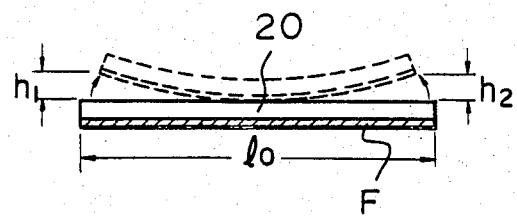
FIG. 2 is a drawing illustrating the curl of the perpendicular magnetic recording medium.

Referring to FIG. 2, the method for determining the curl of the perpendicular magnetic recording medium is schematically illustrated. The degree of curl (Kp) is expressed by:

$$Kp = \frac{h_1 + h_2}{2l_0} \times 100(\%),$$

wherein the symbol $l_0$ indicates the length of a specimen without curl and the symbols $h_1$, $h_2$ indicate the deviation of a specimen with curl from both ends of the specimen without curl. According to their definition in this specification, the positive polarity of curl is a curl in which the perpendicular magnetic recording layer (F) and the base are bent outwardly and inwardly, respectively, while the negative polarity of a curl is a curl in which the perpendicular magnetic recording layer and the base are bent inwardly and outward, respectively. According to the present invention, the absolute degree of curl (Kp) can be not more than 15%, preferably not more than 10%.

The length of specimen is approximately 10 mm, and the thickness of base 20 is usual value for magnetic recording, i.e. 100 microns or less.

Figure 3:
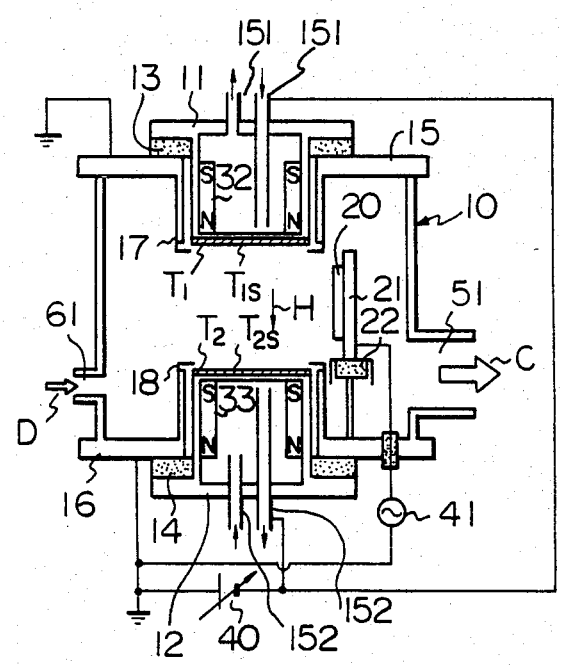
FIG. 3 is a drawing similar to FIG. 1 and schematically illustrates a sputtering device with magnets mounted behind the cathode targets.
Figures 4, 5:
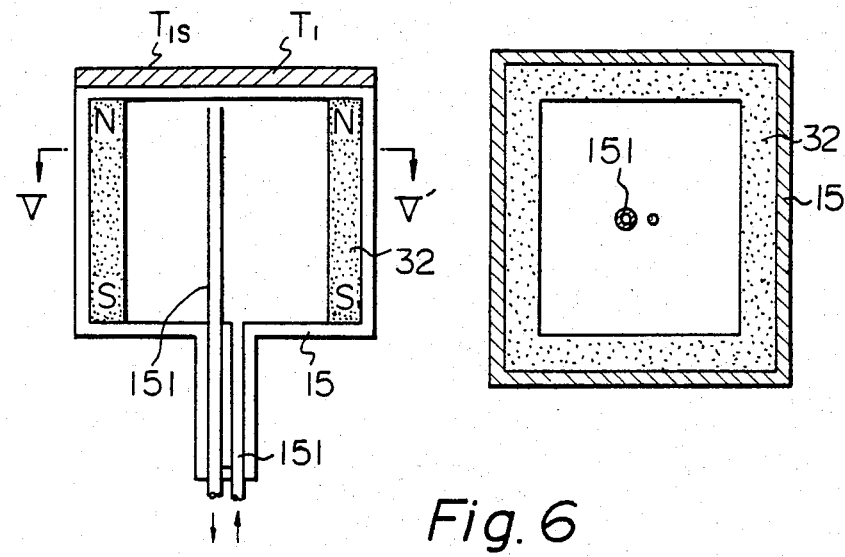
FIG. 4 is a cross-sectional view of the cathode targets.
FIG. 5 is a cross-sectional view along line V—V' of FIG. 4.

The opposing target sputtering device shown in FIGS. 3 is more advantageous than the device shown in FIG. 1 in regard to the fact that the magnetic field H is not formed entirely within the vacuum vessel 10, as it is in the device shown in FIG. 1, but is locally formed. In other words, in the device shown in FIG. 1, the electron density is locally high around the central axis across the targets $T_1$, $T_2$. Contrary to this, the electron density is uniform in the space between the targets $T_1$, $T_2$ in the device shown in FIG. 3. In FIG. 3, the same reference numerals as in FIG. 1 denote the same members. Reference 22 denotes an insulating member which electrically insulates the base 20 from the vacuum vessel 10, and the base a bias power source 41 (FIG. 4). A shutter (not shown) disposed within the vacuum vessel 10 advances into the gap between the base 20 and the targets $T_1$, $T_2$ and protects the base 20 from the pre-sputtering gases. The shutter retracts from the gap upon completion of pre-sputtering.

In the opposing target sputtering device shown in FIG. 3 the perpendicular magnetic field is generated only between the targets $T_1$, $T_2$. The generation of such perpendicular magnetic field is made possible by locating permanent magnets 32, 33 behind the targets $T_1$, $T_2$. The permanent magnets 32, 33 (FIGS. 4 and 5) are located in such a manner that the N pole of the permanent magnet 32 situated behind the target $T_1$ is opposite to the S pole of the permanent magnet 33 situated behind the target $T_2$. The magnetic field between the N and S poles mentioned above is, therefore, perpendicular to the targets $T_1$, $T_2$ and is also confined between the targets $T_1$, $T_2$. The targets $T_1$, $T_2$ and the permanent magnets 32, 33 are cooled by a cooling medium, such as water, admitted into the inner space of the target holders 11, 12 via the cooling medium conduits 151, 152. The magnetic field formed solely between the targets $T_1$, $T_2$ results in the uniform distribution of electrons in the space between the targets $T_1$, $T_2$. Since the density of plasma particles in such space is uniformly high, sputtering of the targets $T_1$, $T_2$ is accelerated and the diffusion of metals from such space is enhanced, with the result that the deposition rate of the metals on the base 20 is further increased as compared with the opposing target sputtering device shown in FIG. 1. The arrangement of the permanent magnets 32, 33 behind the targets $T_1$, $T_2$ is advantageous from an industrial point of view because the structure of the opposing target sputtering device is simplified. In addition, the arrangement of the permanent magnets 32, 33 solely along the periphery of the targets $T_1$, $T_2$ results in a local distribution of the magnetic field along such periphery. The results of the experiments of the present inventors revealed that the entire surface of the targets $T_1$, $T_2$ can be virtually uniformly subjected to sputtering due to this local distribution of the magnetic field. This is very advantageous because sputtering efficiency can be enhanced or high-speed sputtering can be achieved without causing a local elevation of temperature in the targets $T_1$, $T_2$. Furthermore, the permanent magnets can be located entirely behind the targets $T_1$, $T_2$.

As can be understood from the permanent magnets 32, 33 shown in FIGS. 4 and 5, said magnets are hollow and have a rectangular cross section. It can be understood from FIGS. 4 and 5 that the magnetic field between the targets $T_1$, $T_2$ completely surrounds the outer periphery of the space between the targets $T_1$, $T_2$.

In the opposing target sputtering devices shown in FIGS. 3 and 4, a bias potential is applied to the base 20 from the bias power source 41, which is an alternating current source in FIG. 4 but may be a direct current source. The bias potential of the base 20, which is lower than the ground potential, generates an electric field which is virtually perpendicular to the base 20. The frequency of alternating current should be RF frequency. It is supposed that the rate of deposition of metals on the base 20 and the crystallographic properties of the cobalt alloy can be improved by the bias potential.

Figure 6:
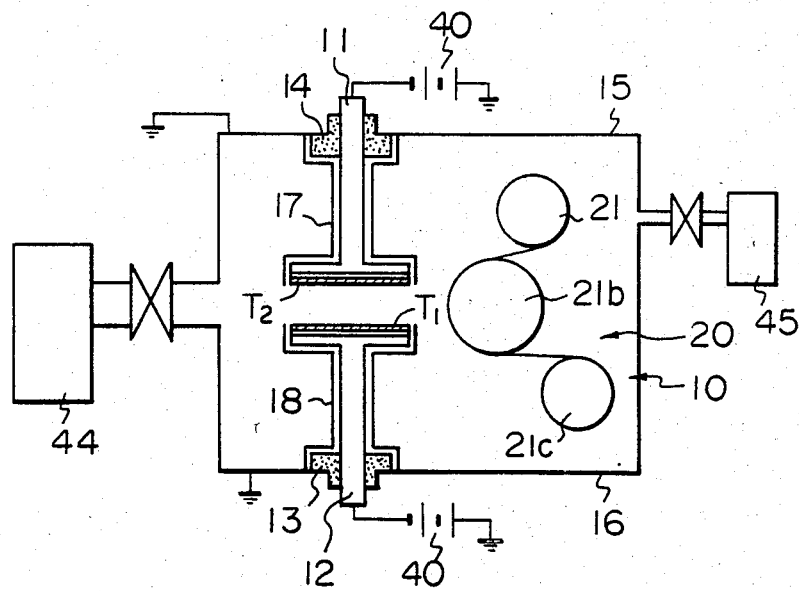
FIG. 6 is a drawing similar to FIG. 3.

In the opposing target sputtering device shown in FIG. 6, the base 20 is in the form of a film and the base holders 21 are in the form of a roll. In FIG. 6, the same reference numerals as in FIG. 1 denote the same members. The reference numerals 44 and 45 denote an evacuating system and a gas-introducing system, respectively. The unwinding roll 21a, the supporting roll 21b and the winding roll 21c are rotatably mounted on each bracket (not shown) and are aligned so that their axes are parallel to each other. The surface of the base 20 to be subjected to the deposition of metals thereon is successively conveyed to face the space between the targets $T_1$, $T_2$ by the unwinding and winding rolls 21a and 21c, respectively, while the supporting roll 21b supports said surface virtually perpendicularly to the surface of the targets $T_1$, $T_2$.

When using opposing target sputtering devices such as those shown in FIGS. 1, 3, and 6, a less expensive and lower heat-resistant macromolecular material than that used in the conventional method can be used for the base 20. Such macromolecular material includes polyester, such as polyethylene terephthalate and polyethylene-2,6 naphthalate, and other organic macromolecular materials having heat resistance at approximately 100° C. at the highest. These materials are usually used as a flexible base in the film form. The polyethylene terephthalate and polyethylene-2,6 naphthalate mentioned above include not only homopolymers but also copolymers, in which 85% or more of the repeating units are polyethylene terephthalate or polyethylene naphthalate.

The theory of forming the perpendicular magnetic recording medium by means of the opposing target sputtering device (FIGS. 1, 3, and 6) is now explained although the scope of the present invention is not limited to such theory.

The sputtering gas, usually argon gas ionized as Ar+ ions, which is accelerated due to the cathode drop in front of the targets $T_1$, $T_2$, impinges the sputtering surfaces $T_{1s}$, $T_{2s}$, with the result that gamma electrons are expelled from the sputtering surfaces $T_{1s}$, $T_{2s}$. The magnetic field is generated between the targets $T_1$, $T_2$ perpendicular to the sputtering surfaces $T_{1s}$, $T_{2s}$, and the electric field at the cathode drop space in front of the targets is directed parallel to the magnetic field. The direction of the electric field is the same as and opposite to the magnetic field. The gamma electrons expelled from either of the targets $T_1$, $T_2$ are moved toward the opposite target while the gamma electrons are confined in the space between the targets $T_1$, $T_2$. The gamma electrons are then reflected from the opposite target while simultaneously being confined in said space. During the reciprocal movement of the gamma electrons, the gamma electrons collide with the neutral gases so that these gases are ionized and electrons are simultaneously expelled from the gases. The so-ionized gases promote the emission of gamma electrons from the targets $T_1$, $T_2$ and, in turn, ionization and electron formation occur. A high density plasma is, therefore, formed in the space between the targets $T_1$, $T_2$, resulting in an increase in sputtering of the cobalt alloy material from the targets $T_1$, $T_2$ and an increase in the deposition rate. As is described in reference to the illustration of FIG. 1, the opposing target sputtering device has been used to form ferromagnetic material films for magnetic heads. However, these films do not have perpendicular anisotropy. The present inventors discovered that a perpendicular magnetic medium can be produced by means of opposing target sputtering devices. And the production rate is considerably higher than that by means of conventional sputtering devices. The fact that the magnetic layer has perpendicular anisotropy appears to be due to the confinement of the gamma electrons and the position of the base, that is, the base is positioned next to the space between the targets $T_1$, $T_2$ where the influence of the argon ions, the gamma electrons and the secondary electrons is not very appreciable. In other words, the base 20 is not exposed to the plasma gas between the targets $T_1$, $T_2$. However, the metals of the cobalt alloy, which are sputterd from the targets $T_1$, $T_2$ can be deposited on the base 20 at a high rate. This appears to be realized by the fact that sputtering is promoted as stated above. The diffusion of metals from the space between the targets $T_1$, $T_2$ toward the base 20 takes place, and the metals are cooled during diffusion so that the metal particles formed during the cooling process are very liable to form an hcp structure and a homogeneous layer on the base 20. Since the kinetic energy of the diffused metals is considerably less than that of the metals directly after sputtering, the kinetic energy of metals deposited on the base is very low, which seems to result in perpendicular anisotropy and low degree of curl (Kp).

In the method of the present invention, the base is advantageously subjected to bombardment in a glow discharge before sputtering.

In the opposing target sputtering device shown in FIG. 1, an electromagnetic force (f) is generated between the magnetic field (H) and the current (i) which is generated by motion of the secondary electrons, gamma electrons, argon ions and the ionized metal particles. The electromagnetic force (f) is expressed by:

$$f \propto H \cdot i$$

The argon ions are subjected to the electromagnetic force (f) when they diffuse from the space between the targets $T_1$, $T_2$ toward the base 20. However, the electromagnetic force (f) is decreased as the argon ions are diffused. The direction of the electromagnetic force (f) is determined by Fleming's left-hand rule, and it is inclined relative to the surface of the base 20. The argon ions therefore impinge on the base 20 from the inclined direction, which seems to be undesirable for the uniform formation of perpendicular magnetic recording layer. Contraty to this, in the opposing target sputtering devices shown in FIGS. 3 and 4 and provided with a bias power source 41, the bias potential is applied to the base 20 and its surface is kept electrically neutral during the sputtering so that the ionized metal particles can impinge on the base 20 in a direction which is virtually perpendicular to the base 20. The impinging kinetic energy is proportional to the bias potential, which generates the electric field perpendicular to the base 20. Perpendicular impinging of the ionized metal particles under an appropriate kinetic energy, especially at the beginning of sputtering, is advantageous for perpendicular anisotropy of cobalt alloy and also for a small degree of curl. Such kinetic energy can be ensured by a bias potential of not more than −100 V.

The present inventors also studied the pattern of perpendicular magnetic layers and its influence upon the properties of the layers, particularly the curl and flexibility of magnetic recording mediums.

Figure 15:
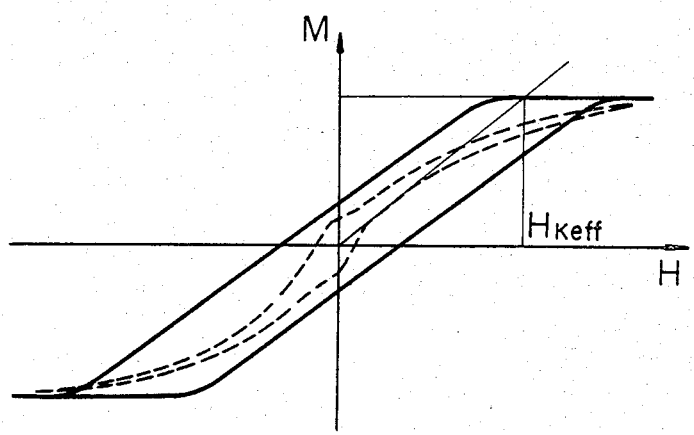
FIG. 15 shows two hysteresis curves of the perpendicular magnetic recording medium; and, FIGS. 16 and 17 are graphs illustrating the relationship between the magnetic properties and the growth rate.

The pattern of magnetic recording layers was investigated by means of a diffraction electronmicroscope produced by Japan Electron Co., Ltd (JSM-35C type). The crystallographic structure of the magnetic recording mediums was identified by means of a scaling X-ray diffractometer produced by Rigakudenki Co., Ltd. The degree of perpendicular orientation of the magnetic layers was determined by subjecting these layers to X-ray diffraction, obtaining the rocking curve of the (002) planes of the hcp structure, and measuring the half value width $\Delta\theta_{50}$. The perpendicular coercive force Hcv and anisotropy field Hk of the perpendicular magnetic layers were measured by means of a vibration sample magnetometer (VSM) produced by Toeikogyo K.K. The method of measuring the anisotropy field Hk was based on the method reported in IEEE TRANSACTIONS OF MAGNETICS, VOL. MAG-16, No. 5, SEPT. 1980, page 1,113. FIG. 15 shows the method of illustrating the anisotropy field Hk. The solid lines and the broken lines indicate the perpendicular hysteresis and the in-plane hysteresis, respectively. An effective anisotropy field Hkeff is obtained by drawing the maximum permeability line of the in-plane hysteresis and then determining the intersecting line of the maximum permeability line with the perpendicular hysteresis curve.

Figure 7:
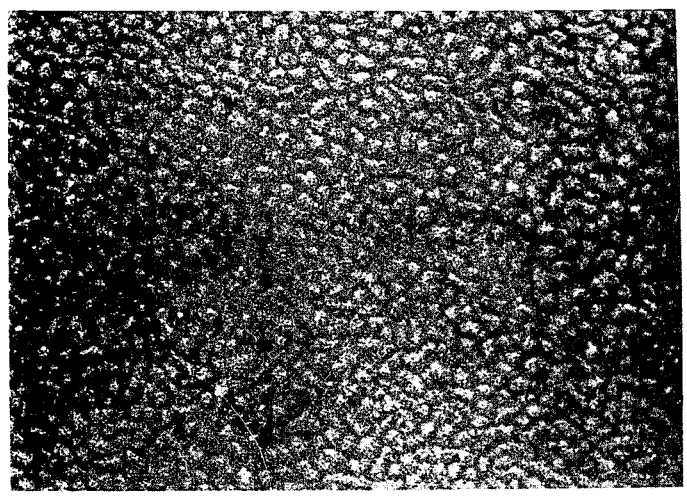
FIGS. 7 and 8 are electronmicroscopic photograph of the surface and cross section of the perpendicular magnetic recording film which does not have the pattern of the present invention.
Figure 8:
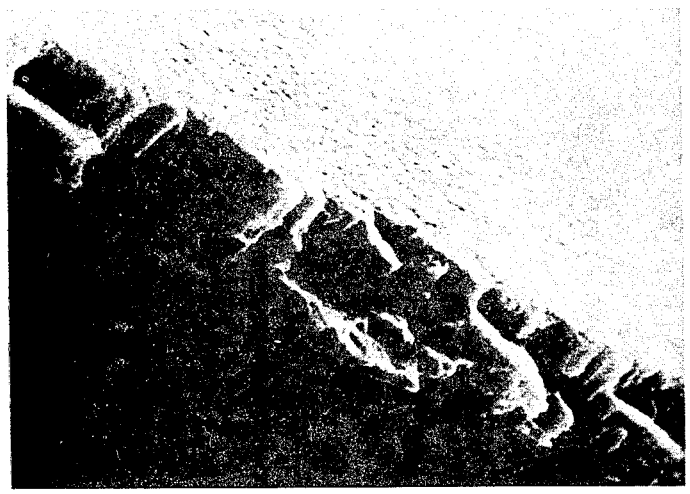

Referring to FIGS. 7 and 8, the pattern of a perpendicular magnetic recording layer produced by a conventional sputtering device is shown. This layer was produced under the following conditions:
A. The Sputtering Device
   A DC magnetron sputtering device was equipped with a base holder and target arranged oppositely to one another in the vacuum vessel. A bias potential of −100 V was applied to the base holder.
B. Base:
   A 75-micron thick polyimide film.
C. Thickness of the Magnetic Film:
   0.8 micron Referring to FIGS. 9 and 10, which are electron microscopic photographs similar to FIGS. 7 and 8, respectively, an example of the pattern of a perpendicular magnetic recording layer according to the present invention is shown. This layer was produced under the following conditions:
A. The Opposing Target Sputtering Device (FIG. 3)
   (1) Material of the Targets $T_1$, $T_2$: cobalt alloy containing 17% by weight (18.5 atomic %) of chromium
   (2) Distance Between the Targets $T_1$, $T_2$: 100 mm
   (3) Magnetic Field in the Neighborhood of the Targets $T_1$, $T_2$: 150~300 gauss
   (4) Dimension of the Targets $T_1$, $T_2$: 150 mm × 100 mm × 5 mm (thickness)
   (5) Distance of the Base 20 from the End of the Targets $T_1$, $T_2$: 35 mm
B. Base
   a 75-micron thick polyimide film
C. Thickness of the Magnetic Layer:
   1.3 microns The perpendicular magnetic recording layer was produced by the following procedure.

The base 20 was first fixed on the base holder 21 and then the gas in the vacuum vessel was evacuated until an ultimate degree of vacuum of $1 \times 10^{-6}$ Torr or less could be achieved. Subsequently, the argon gas was admitted into the vacuum vessel 10 until the pressure was increased to 4 mm Torr. After pre-sputtering amounting to 3 to 5 minutes, the shutter (not shown in FIG. 3) was retracted and the formation of a perpendicular magnetic recording layer on the base was initiated.

Several properties of the magnetic mediums so produced are given in Table 1.

TABLE 1

| Samples | Crystals Structure | $\Delta\theta_{50}$ (°) | Degree of Curl Kp (%) | Hcv(Oe) | Hkeff (KOe) | Ms(emu/cc) |
|---|---|---|---|---|---|---|
| Invention (FIGS. 9 and 10) | hcp (002) | 3.0 | +3 | 930 | 5.4 | 550 |
| Comparative Example (FIGS. 7 and 8) | hcp (002) | 5.6 | +17 | 1100 | 5.4 | 565 |

The magnetic properties of both samples very well satisfy the requirements for the magnetic properties in the perpendicular magnetic recording layer mentioned hereinabove in the description of the background of the invention. However, the degree of curl (Kp) of the present invention is +3%, a very small degree, while the degree of curl (Kp) of the comparative example is +17%, a very large degree. If the magnetic medium of the comparative example is commercially applied, the spacing loss between the magnetic head and the magnetic medium is so large that the electromagnetic conversion characteristic is disadvantageously decreased.

The deposition rate of cobalt alloy in the method of the invention using the opposing target sputtering device was 0.10 micron (1000 Å) per minute, while the deposition rate in the comparative example using the conventional sputtering device was 0.02 micron (200 Å) per minute. When the method of the present invention is compared with the method of the comparative example, it can be concluded that the deposition rate of the present invention is five times as high as that of the comparative example and achieves a degree of curl (Kp) superior to and magnetic properties equivalent to those of the comparative example.

Figure 9:
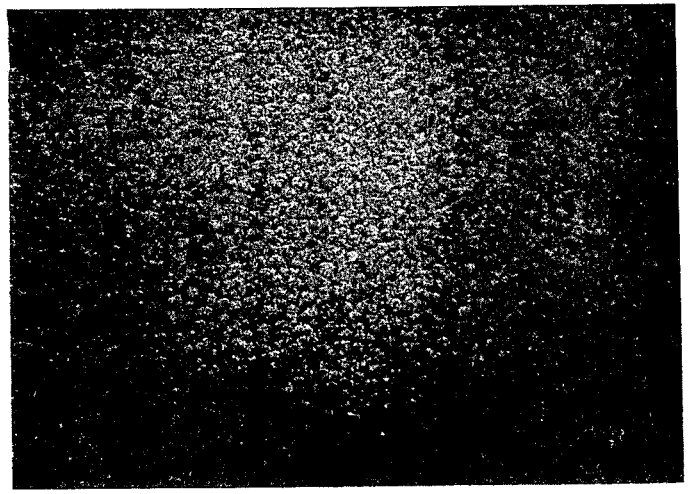
FIGS. 9 and 10 are photographs similar to FIGS. 7 and 8, respectively, but illustrate the film of the present invention.
Figure 10:
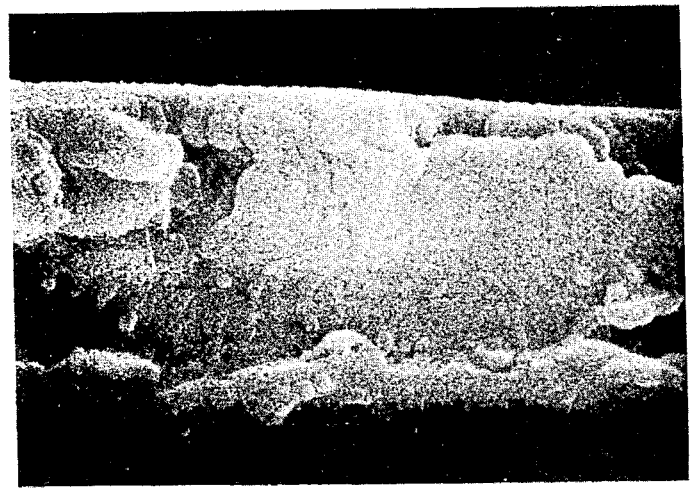

When FIGS. 7 and 8 of the comparative example and FIGS. 9 and 10 of the present invention are compared, the following conclusion can be obtained.

The crystals of both samples are hcp and the half value widths ($\Delta\theta_{50}$) of both samples are not largely different from one another. In addition, the surface pattern of both samples shown in FIGS. 7 and 8 shows fine particles which aggregate next to each other forming grain boundaries. The surface pattern of the perpendicular magnetic recording layer according to the present invention is not different from that of the comparative example. The diameter of the fine particles shown in FIG. 9 is almost uniform and is approximately 500 Å on the average. Contrary to the similarity between the surface patterns, of the present invnetion and the comparative example the cross section pattern shown in FIG. 10 (the present invention) is completely different from that shown in FIG. 9 (the comparative example).

In FIG. 8, the stripe patterns are elongated longitudinally and perpendicularly to the layer surface, and the border between neighbouring longitudinal patterns is similar to a crack. In FIG. 10, the longitudinal elongated patterns cannot be detected; instead, the cross section is composed of particles, each particle having a similar dimension in any direction. These particles have an irregular shape, e.g. polygonal, ellipsoidal and the like, but definitely do not have a columnar shape. The dimension of all of the particles is not constant throughout the cross section; it tends to be larger in the neighborhood of the layer surface than in the neighborhood of the base. The dimension of the particles in terms of a circumscribed circle of the particles is approximately 2000 Å at the maximum. Particles with such a dimension are present near the layer surface. Also, judging from the comparison of the pattern shown in FIG. 10 with the columnar pattern previously reported in several technical reports and papers, the pattern shown in FIG. 10 is distinctly different from the columnar pattern.

It has been previously believed in the art of perpendicular magnetic recording mediums that perpendicular anisotropy is mainly attributable to a columnar pattern. Surprisingly, however, perpendicular magnetic recording film, which does not have a columnar pattern but a particle pattern, possesses magnetic properties equivalent to those of conventional perpendicular magnetic recording layers having a columnar pattern and even possess a degree of curl which is less than that of conventional layers. These merits seem to be possible for the following reasons. Non-columnar particles also have an axis of easy magnetization (the C axis of hcp cobalt) normal to the layer surface, and the internal stress or strain induced during their deposition is extremely reduced in comparison with the internal stress or strain induced during the deposition of cobalt alloy having a columnar structure. In the non-columnar pattern discovered by the present inventors, it should not be construed that colummnar crystals cannot be formed at all. Rather, it is reasonable to construe that the boundary layer of columnar crystals is too thin to be detected by an electron microscope. Since the boundary layers, which resemble cracks, in the conventional perpendicular magnetic layers cannot be detected in the layers of the present invention, one can conclude that the cobalt alloy crystals are very homogeneous in the present invention. Furthermore, since the information to be written in the perpendicular magnetic layer can be recorded in the cobalt alloy crystal grains but cannot be recorded in the boundary layers, a high recording density could be achieved in the perpendicular recording mediums of the present invention. Also, the low flexibility of the conventional perpendicular magnetic recording mediums may be ascribed to the boundaries, which, however, cannot be detected in such mediums of the present invention.

The non-columnar pattern is hereinafter referred to as particle pattern, in which the particles exhibit similar or not greatly different dimensions in all directions. However, it is to be noted that "particle pattern" indicates a similarity of dimensions as seen solely in the cross section of a layer. Such pattern is similar to the pattern of equiaxed particles.

Figure 11:
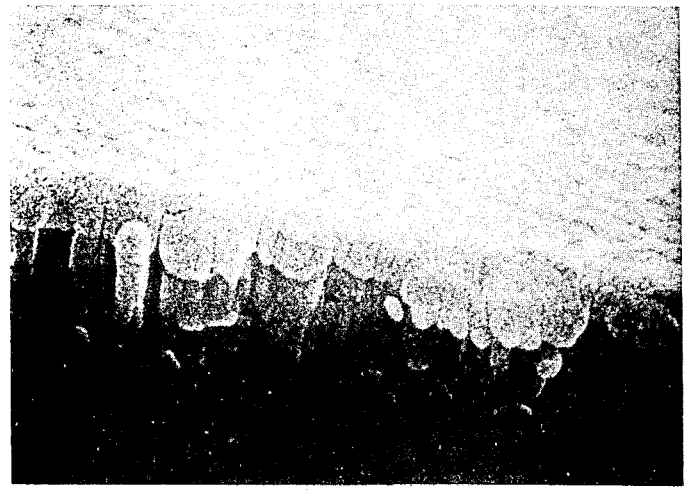
FIG. 11 shows an example of the columnar pattern.
Figure 12:
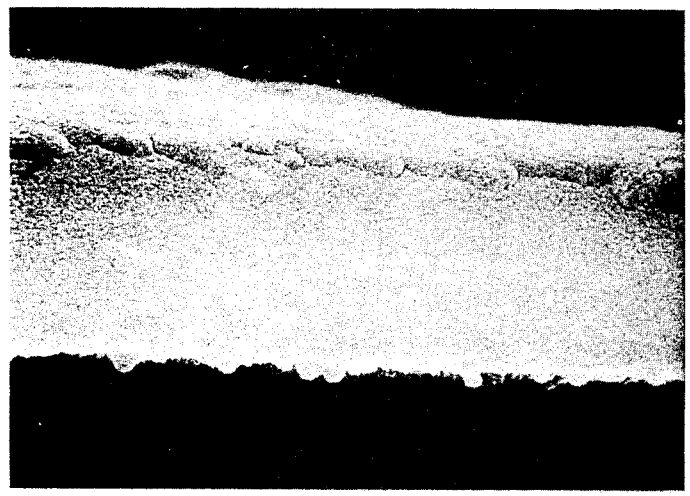
FIGS. 12 and 13 show examples of the particle pattern of the present invention.
Figure 13:
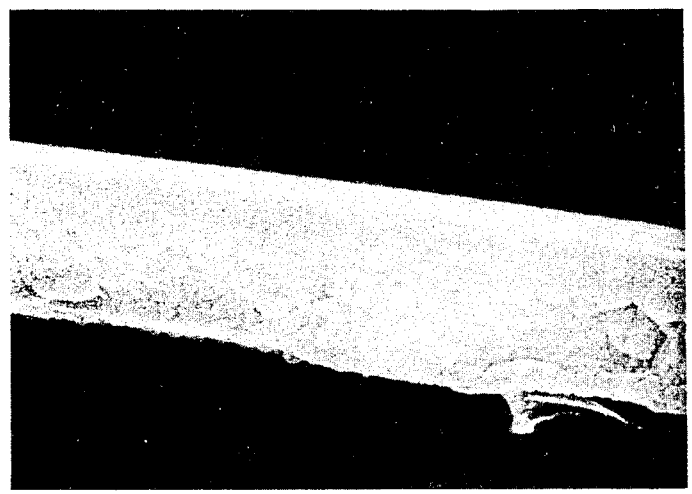

Other examwples of columnar pattern and particle pattern are further explained. Referring to FIG. 11, an example of a columnar pattern is shown. In this pattern, the degree of curl is inferior to that of the particle pattern. The particle pattern shown in FIGS. 12 and 13 exhibits an excellent anti-curling tendency. In particle pattern, the particle size is not uniform throughout the cross section of the perpendicular magnetic recording layer, but the particles exhibit similar dimensions in all directions as seen in the cross section.

The specimens for observing the surface structure (FIGS. 8 and 10) were prepared by depositing an Au-Pb layer on the perpendicular magnetic recording layers to a thickness of approximately 200 Å. Electronmicroscopic photographs were taken at a magnification of 40,000 and under an acceleration voltage of 25 kV. The specimens for observing the cross sectional pattern (FIGS. 8 and 10) were prepared by putting the magnetic recording mediums into a gelation capsule together with ethyl alcohl, cooling the capsule with liquid nitrogen for two hours, and then cleaving the capsule with a cleaving knife. The device used for the freeze-cleaving method was a TF-1 type device produced by Eiko Engineering Co. Ltd.

The cobalt alloy used in the present invention as the material for a perpendicular magnetic recording layer is mainly composed of cobalt and additionally chromium. Another additional element or elements, which do not alter the hcp structure, may be incorporated into the cobalt alloy. The present inventors discovered that rhenium, tungsten and molybdenum which can be incorporated into the cobalt alloy in addition to chromium in amounts of from 2 to 10 atomic %, cannot alter the hcp structure of cobalt; rather, these elements advantageously decrease the half value width ($\Delta\theta_{50}$) and increase the deposition rate of cobalt alloy. The atomic percentage of chromium(x) and the atomic percentage of rhenium, tungsten and molybdenum(y) should have the following values:

$$8(\%) \leq x$$

$$2(\%) \leq y \leq 10(\%) \text{ and}$$

$$10(\%) \leq x+y \leq 27(\%)$$

Although three alloying elements are described, other elements which do not alter the hcp structure by forming a second phase might be contained in the cobalt alloy.

Figure 14:
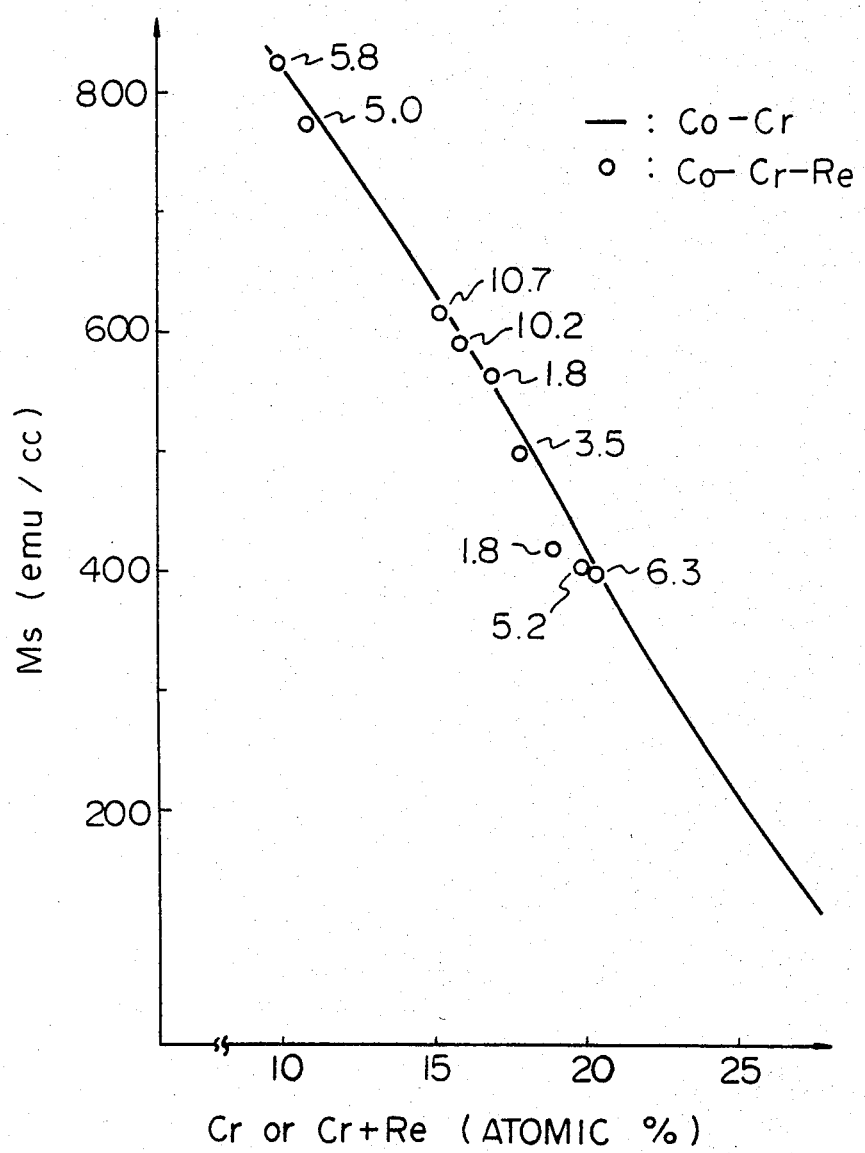
FIG. 14 is a graph indicating the relationship between saturation magnetization and alloying contents.

Referring to FIG. 14, the solid line indicates the saturation magnetization of Co-Cr alloys and the spots of symbols "O" indicate the saturation magnetization of Co-Cr-Re alloys with the total contents of chromium and rhemium given in the drawiwng. When perpendicular magnetic layer of these alloys is formed by the DC magnetron sputtering, the degree of curl is large, while the degree of curl can be decreased by the present invention.

The perpendicular magnetic recording medium according to the present invention may comprise, in addition to the base and the perpendicular magnetic recording layer (cobalt alloy film), a layer of soft magnetic metal. The layer of soft magnetic metal may be formed on the surface of the base opposite to the surface where the perpendicular magnetic recording film is formed. Alternatively, the layer of soft magnetic metal may be formed beneath the perpendicular magnetic recording film. The soft magnetic metal herein indicates crystalline ferromagnetic metal having a coercive force of 50 Oe or less or, preferably, 10 Oe or less and high permeability, such as be Permalloy, Alperm and Sendust. The thickness of soft magnetic metal layer should be from 0.10 to 1 micron. A layer of soft magnetic metal can furthermore decrease the degree of curl (Kp).

The base of the perpendicular magnetic recording medium may be made of metal, glass, plastics or other materials having a heat resistance sufficient for withstanding the sputtering. Particularly, organic macromolecular film, such as polyester film, having a lower heat resistance than that of polyimide or polyamide film can be used in the present invention. The organic macromolecular film may contain an inactive inorganic compound, such as MgO, ZnO, $MgCO_3$, $CaCO_3$, $CaSO_4$, $BaSO_4$, $Al_2O_3$, $SiO_2$, or $TiO_2$, for the purpose of adjusting the surface roughness of the film.

In addition, a lubricant may be applied to the surface of the base opposite to the surface where the perpendicular magnetic recording film is formed. The lubricant may be an organic lubricant, e.g. sorbitan, an organic macromolecular lubricant, e.g. polytetrafluoroethylene or polyethylene, or an inorganic lubricant, e.g. alumina, kaolin, silica or molybdenum sulfide. The application of a lubricant is advisable when the film bases do not slide favorably in relation to one another.

The properties of the perpendicular magnetic recording film adapted for use in combination with the current magnetic heads, such as a single pole type head and a ring type head include: a half value width $\Delta\theta_{50} \leq 8°$, a perpendicular coercive force $Hcv \geq 500$ Oe, a ratio of $Hcv/Hch \geq 2.0$, and an anisotropy field $Hk \geq 4KOe$. These properties can be readily achieved in the present invention, as will be understood from the description of the Examples.

The present invention is now explained by way of Examples.

EXAMPLE 1

Samples of the perpendicular magnetic recording medium were prepared under the following conditions.
A. The Opposing Target Sputtering Device (FIG. 3)
  (1) Material of the Targets $T_1$, $T_2$: cobalt alloy containing 17% by weight (18.5 atomic %) of chromium
  (2) Distance Between the Targets $T_1$, $T_2$: 100 mm
  (3) Magnetic Field in the Neighborhood of the Targets $T_1$, $T_2$: 150~300 gauss
  (4) Dimension of the Targets $T_1$, $T_2$: 150 mm × 100 mm × 5 mm (thickness)
  (5) Distance of the Base 20 From the Ends of the Targets $T_1$, $T_2$: 35 mm
B. Base 20:
  a 75 mm thick polyester film
C. Thickness of Cobalt Alloy Layer:
  1.3 microns The perpendicular magnetic recording layer was produced by the followirng procedure.

The base 20 was first fixed on the base holder 21 and then the gas in the vacuum vessel was evacuated until an ultimate degree of vacuum of $1 \times 10^{-6}$ Torr or less could be achieved. Subsequently, an argon gas was admitted into the vacuum vessel 10 until the pressure was increased to 4 mm Torr. After pre-sputtering for 3 to 5 minutes, the shutter (not shown in FIG. 3) was retracted and the formation of a perpendicular magnetic recording layer on the base was initiated.

Several properties of the magnetic mediums so produced are given in Table 1.

The properties of the prepared samples were measured as stated above in the description of the perpendicular magnetic recording films with the columnar or particle-pattern.

The properties of the samples in this Example are given in the following table.

TABLE 2

| Sample Nos. | Thickness of Base (μm) | Crystal Orientation | $\Delta\theta_{50}$ | Degree of curl Kp (%) | Perpendicular Coercive Force Hcv (Oe) |
|---|---|---|---|---|---|
| 1 | 16 | (002) | 5.0° | 7 | 1050 |
| 2 | 14 | (002) | 4.3° | 8 | 1030 |
| 3 | 12 | (002) | 4.5° | 10 | 1000 |
| 4 | 10 | (002) | 3.2° | 14 | 1100 |

The samples (the cleaved surface of the samples) were of particle pattern. The degree of curl (Kp) was increased in accordance with the decrease in the thickness of the base, which was polyester film. However, in Sample 4, the degree of curl (Kp), which was 14% was not unfavorable, because the perpendicular magnetic recording layer (cobalt alloy layer) had flexibility as will be explained later.

EXAMPLE 2

Samples of the perpendicular magnetic recording medium were prepared by successively forming on a base of Permalloy magnetic layer and a cobalt alloy layer under the following conditions.
A. Formation of Permalloy Layer
  (1) Opposing Target Sputtering: device used in Example 1
  (2) Targets: permalloy plates of 80 wt% of nickel and 20 wt% of iron
  (3) Operating Condition: an argon pressure of $1 \times 10^{-2}$ Torr and a deposition rate of 400 Å/minute
  (4) Obtained Permalloy Layer: the layer had a coercive force of 16 Oe
and a thickness of 0.44 microns (μm).
B. Formation of Co alloy Layer
The Co alloy Layer was formed under the same conditions as in Sample 3 of Example 1.

The electromagnetic conversion characteristic of the sample prepared in the present Example (Sample 5) was evaluated by means of the magnetic head of the perpendicular magnetic recording mode, in which the main and auxiliary electrodes are opposed to one another.

TABLE 3

| Recording Density (KBPI) | 1 | 10 | 50 | 100 | 150 |
|---|---|---|---|---|---|
| Output (S/N) (dB) | 35 | 35 | 25 | 16 | 8 |

The electromagnetic conversion characteristic in terms of the output of magnetic head did not vary appreciably after the perpendicular magnetic recording medium (Sample 5) had been used repeatedly a thousand times, thereby proving the favarable flexibility of the magnetic tape. The cross-sectional pattern of Sample 5 was particle.

EXAMPLE 3

Samples of the perpendicular magnetic recording medium were prepared under the following conditions.
A. Opposing Target Sputtering Device (FIG. 6)
  (1) Material of the Targets $T_1$, $T_2$: cobalt alloy containing 17% by weight (18.5 atomic %) of chromium.
  (2) Base 20: a 75-micron thick polyimide film (3) Distance Between the Targets $T_1$ and $T_2$: 100 mm
(4) Magnetic Field in the Neighborhood of the Targets $T_1$, $T_2$: 150~300 gauss
(5) Dimension of the Targets $T_1$, $T_2$: 300 mm × 125 mm × 5 mm (thickness)
(6) Distance of the Base from the Ends of the Targets $T_1$, $T_2$: 30 mm B. Operation Procedure The cobalt alloy layer was formed by successively performing the following procedures.

(1) The base 20 was fixed on the base holder 21 and then the vacuum vessel 10 was evacuated until an ultimate degree of vacuum of $2 \times 10^{-6}$ Torr or less was achieved.

(2) Argon gas was admitted into the vacuum vessel 10 until the pressure of 4 mm Torr or 1.5 mm Torr was obtained. After the pre-sputtering for 3 to 5 minutes, the shutter (not shown in FIG. 6) was retracted, thereby exposing the base 20 to the plasma gas. The base was held in a stationary position.

Several properties of the samples are given in Table 4.

TABLE 4

| Sample No. | Preparation Conditions | | Half Value Width $\Delta\theta_{50}$ | Magnetic Properties | | | Degree of Curl Kp (%) |
|---|---|---|---|---|---|---|---|
| | Deposition Rate (Å/min) | Ar Gas Pressure (mm Torr) | | Hcv (Oe) | Hcv/Hch | Hkeff (KOe) | |
| 6 | 4290 | 4 | 6.5° | 1220 | 2.7 | 4.5 | +11 |
| 7 | 2300 | 4 | 6.2° | 1100 | 2.5 | 4.8 | +9 |
| 8 | 1150 | 4 | 5.0° | 750 | 2.6 | 5.3 | +5 |
| 9 | 1610 | 1.5 | 5.0° | 1020 | 2.8 | 5.0 | +8 |

The symbol of "Hch" in Table 4 indicates the horizontal coercive force.

As is apparent from Table 4, the excellent perpendicular magnetic layers can be prepared by means of a method which achieves high deposition rate. In addition, the degree of curl (Kp) is advantageously low.

EXAMPLE 4

The same procedure as in Example 3 was repeated; however, the base was a 50 micron polyester film and the argon gas pressure was that given in Table 5.

Several properties of the samples are given in Table 5.

TABLE 5

| Sample Nos. | Preparation Conditions | | Half Value Width $\Delta\theta_{50}$ | Magnetic Properties | | | Degree of Curl Kp (%) |
|---|---|---|---|---|---|---|---|
| | Deposition Rate (Å/min) | Argon Gas Pressure (mm Torr) | | Hcv (Oe) | Hcv/Hch | Hkeff (KOe) | |
| 10 | 1090 | 8 | 6.4° | 660 | 2.6 | 4.8 | +5 |
| 11 | 1200 | 4 | 5.0° | 600 | 2.6 | 4.7 | +5 |
| 12 | 1170 | 1.5 | 4.5° | 550 | 2.7 | 4.5 | +6 |

As is apparent from Table 5, the deposition rate is high, the degree of curl (Kp) is low and a polyester film having a low heat resistance can be used as the base of a perpendicular magnetic recording medium. In addition, the argon gas pressure can be varied in a broad range.

EXAMPLE 5

The same procedure as in Example 3 was repeated. However, in the operation procedure (2) an ion bombardment was carried out prior to depositing the cobalt alloy on the base (75 micron thick polyimide film). For the ion bombardment, the argon gas pressure was adjusted to 50 mm Torr and an alternating voltage of 300 V was applied between the shutter and the base for a period of three minutes, thereby inducing a glow discharge and ion bombardment of the base. Some of the bases of the samples in the present examples were subjected to degassing at 280° C. for a period of 60 minutes in vacuum.

Several properties of the samples are given in Table 6.

TABLE 6

| Sample Nos. | Preparation Condition | | Half Value Width $\Delta\theta_{50}$ | Magnetic Properties | | | Degree of Curl Kp (%) | Degassing |
|---|---|---|---|---|---|---|---|---|
| | Deposition Rate (Å/min) | Argon Gas Pressure (mm Torr) | | Hc (Oe) | Hcv/Hch | Hkeff (KOe) | | |
| 13 | 1190 | 1.5 | 2.9° | 700 | 2.6 | 5.4 | +11 | x |
| 14 | 1280 | 1.5 | 2.9° | 940 | 2.6 | 5.4 | +6 | o |
| 15 | 1260 | 4 | 3.7° | 1060 | 3.1 | 5.7 | +6 | o |
| 16 | 2000 | 4 | 3.4° | 850 | 2.4 | 5.4 | +10 | x |
| 17 | 2410 | 4 | 2.8° | 1120 | 2.4 | 5.9 | +11 | o |
| 18 | 520 | 4 | 4.6° | 820 | 2.5 | 5.5 | +4 | x |
| 19 | 590 | 4 | 4.7° | 990 | 2.8 | 5.7 | +8 | o |
| 20 | 3690 | 4 | 3.1° | 1150 | 3.3 | 5.5 | +11 | x |
| 21 | 3910 | 4 | 3.0° | 1150 | 2.7 | 5.6 | +11 | o |

Such gaseous components as moisture, water and the like, were analyzed with a mass spectrograph (SM-800 type produced by Japan Vacuum Enginnering), when an ultimate degree of vacuum was attained during the formation of the perpendicular magnetic recording layers. The gas pressures of moisture ($H_2O$) and oxygen ($O_2$) were $1.5 \times 10^{-6}$ Torr and $8 \times 10^{-8}$ Torr, respectively. The degree of vacuum in the present example was, therefore, about one tenth as low as about $2 \times 10^{-7}$ Torr which is the degree of vacuum required for the conventional RF sputtering. This degree of vacuum would be advantageous from a commercial point of view, because the perpendicular magnetic recording layers could be produced economically by a vacuum evacuation system with low capacity. The properties of the perpendicular magnetic recording layers were not significantly influenced by the degassing. Degassing, which is allegedly indispensable for polyimide films in conventional RF sputtering, can therefore be omitted according to the present invention.

EXAMPLE 6

Figure 16:
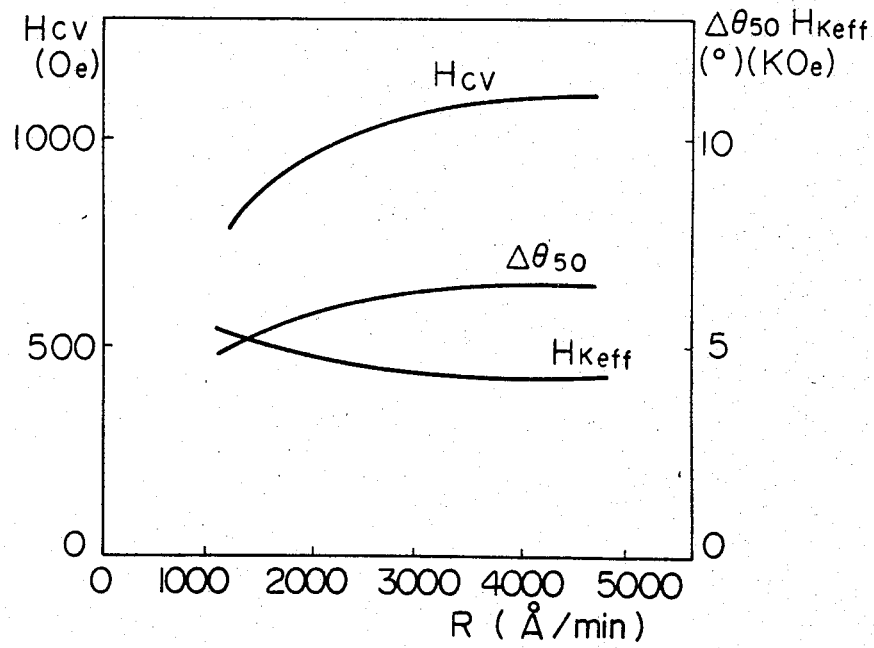

The procedure of Example 1 was repeated. However, the argon gas pressure was 4 mm Torr and the deposition rate varied. The results are given in FIG. 16, wherein the abscissa indicates the deposition rate (R) and the ordinate indicates the perpendicular coercive force (Hcv), the antisotropy field (Hkeff) and the half value width ($\Delta\theta_{50}$). As is apparent from FIG. 16, an increase in the deposition rate (R) of up to 4000 Å per minute does not result in deterioration of the magnetic properties required for the perpendicular magnetic recording mediums; but rather the perpendicular coercive force Hcv is increased at a higher deposition rate.

The temperature of the base was normal temperature (about 20° C.) at the beginning of sputtering and was not intentionally elevated. Without intentional heating of the base, which has been believed to be indispensable in the RF sputtering, the cobalt alloy layers having good perpendicular magnetic recording properteis could be produced at a high deposition rate of 4000 Å per minute.

EXAMPLE 7

Figure 17:
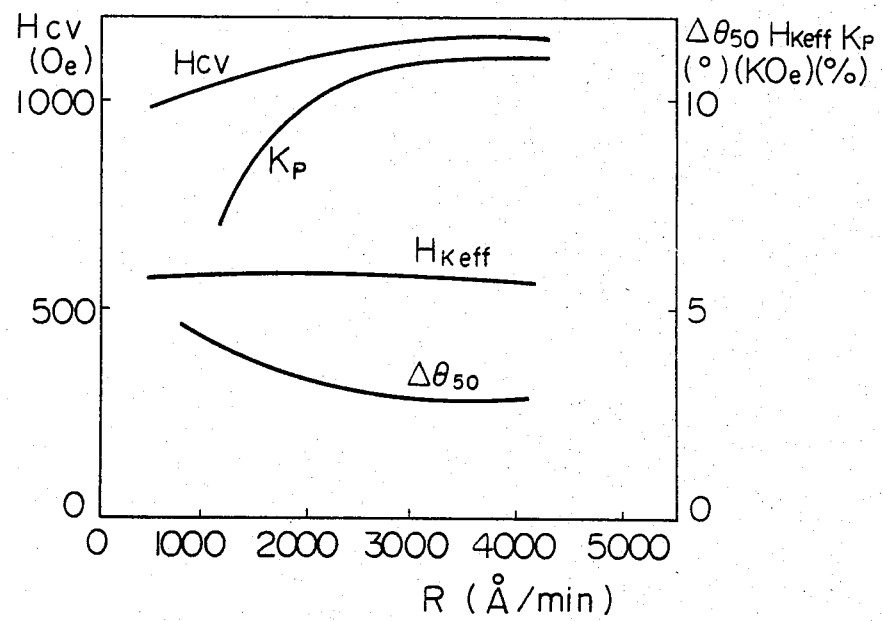

The same procedure as in Example 5 was repeated. However, the argon gas pressure was 4 mm Torr and the deposition rate of cobalt alloy layer was varied up to a level of approximately 4000 Å/min. The results are given in FIG. 17. The tendency of the magnetic properties and half value width depending on the deposition rate (R) shown in FIG. 17 is similar to that shown in FIG. 16. However, in FIG. 17, the half value width ($\Delta\theta_{50}$) is advantageously decreased with an increase in the deposition rate (R), which is due to the bombardment in a glow discharge in the present Example.

The degree of curl (Kp) shown in FIG. 17 is acceptable, although it increases high at a high deposition rate (R) of about 4000 Å/min.

EXAMPLE 8

Samples of the perpendicular magnetic recording medium were prepared under the following conditions.
A. Opposing Target Sputtering Device (FIG. 4)
  (1) Material of the Targets $T_1$, $T_2$: cobalt alloy containing 17% by weight of chromium
  (2) Base 20: a 75 micron thick polyimide film
  (3) Distance Between the Targets $T_1$ and $T_2$: 100 mm
  (4) Magnetic Field in the Neighborhood of Targets $T_1$, $T_2$: 100~150 gauss
  (5) Dimension of the Targets $T_1$, $T_2$: 100 mm in diameter $\times$ 5 mm in thickness
  (6) Distance of Base 20 from the Ends of the Targets $T_1$, $T_2$: 25 mm
  (7) Bias Power Source 41: RF current of 13.56 MHz
B. Operation Procedure
  (1) The base 20 was fixed on the base holder 21 and then the vacuum vessel 10 was evacuated until an ultimate degree of $2 \times 10^{-6}$ Torr or less was achieved.
  (2) Argon gas was admitted into the vacuum vessel 10 until a pressure of 4 mm Torr was obtained. Sputtering was carried out at an argon gas pressure of 4 mm Torr while power of 500 W was applied between the targets $T_1$, $T_2$ and shields 17, 18. A 1-micron thick cobalt alloy layer was formed on each base 20. Several properties of the samples are given in the following table.

TABLE 7

| | Preparation Conditions | | | Magnetic Properties | | Degree of Curl |
| | Voltage of Bias Power | Deposition | Half Value | | | |
| Sample Nos. | Source (V) | Rate (Å/min) | Width $\Delta\theta_{50}$ | Hcv (Oe) | Hcv/Hch | Hkeff (KOe) | Kp (%) |
|---|---|---|---|---|---|---|---|
| 22 | 0 | 1150 | 5.0° | 750 | 2.6 | 5.3 | +5.0 |
| 23 | −25 | 1150 | 2.8° | 970 | 3.8 | 5.6 | +5.2 |
| 24 | −50 | 1130 | 2.7° | 1030 | 4.0 | 5.3 | +6.0 |
| 25 | −75 | 1090 | 2.7° | 950 | 4.3 | 5.1 | +8.0 |
| 26 | −100 | 830 | 12.4° | 890 | 2.6 | 4.1 | +13.0 |

In Table 7, the bias voltage was applied to all the samples except for Sample 22. The half value width ($\Delta\theta_{50}$), which indicates the degree of C axis orientation of the cobalt alloy, can be improved by a bias voltage having an absolute value of less than 100 V. The application of a bias voltage of −100 V results in a decrease in the deposition rate, deterioration of the degree of C axis orientation, and an increase in the degree of curl (Kp).

EXAMPLE 9

The procedure of Example 8 was repeated. However, the bias voltage from the bias power source 41 was applied only during the growth period of the cobalt alloy layer up to a thickness of 0.1 μm, and during the remaining growth period, namely the growth of the cobalt alloy layer from 0.1 to 1.0 μm, the bias voltage was kept at 0 V. The results are given in the following table.

TABLE 8

| Sample Nos. | Preparation Conditions | | Half Value Width Δθ₅₀ | Magnetic Properties | | | Degree of Curl Kp (%) |
| --- | --- | --- | --- | --- | --- | --- | --- |
| | Voltage of Bias Power Source (V) | Deposition Rate (Å/min) | | Hcv (Oe) | Hcv/Hch | HKeff (KOe) | |
| 27 | −75 | 1100 | 2.5° | 950 | 3.5 | 5.5 | 5.0 |
| 28 | −100 | 1050 | 2.7° | 1000 | 3.8 | 5.5 | 5.3 |

The obtained half value width ($\Delta\theta_{50}$) and degree of curl (Kp) are very desirable as the properties of the perpendicular magnetic recording mediums.

EXAMPLE 10

The procedure of Example 8 was repeated. However, the Permalloy layer was formed before the formation of the cobalt alloy layer under the following conditions.

A. Opposing Target Sputtering Device (FIG. 3)
 (1) Material of the Targets $T_1$, $T_2$: Ni-Fe Permalloy (22% by weight of iron)
 (2) Base 20: 25 micron thick polyester film
 (3) Magnetic Field in the Neighborhood of the Targets $T_1$, $T_2$: 250~300 gauss
 (4) Distance of Base 20 from the End of the Targets $T_1$, $T_2$: 50 mm
 (5) Bias Power Source 41: Direct Current (0~75 Volt)

B. Operation Procedure

Argon gas was admitted into the vacuum vessel, until the pressure was from 50 to 100 mm Torr. An alternating current of 50 Hz was applied between the anode and cathode at 300 V for a period of 5 minutes, thereby inducing a glow discharge between the anode and cathode and in the neighborhood of the surface of the base. Then the argon gas pressure was decreased to 10 mm Torr, which was the predetermined sputtering pressure. For a period of from 3 to 5 minutes, the base was shielded from the plasma gas by a shutter, and then the shutter was opened to initiate the formation of a perpendicular magnetic recording layer. The results are given in the following table.

TABLE 9

| Sample Nos. | Preparation Condition | | Coercive Force Hc(Oe) | Degree of Curl Kp (%) |
| --- | --- | --- | --- | --- |
| | Bias Voltage of Direct Current (V) | Deposition Rate (Å/min) | | |
| 29 (Control) | 0 | 650 | 11 | −20 |
| 30 | −50 | 650 | 10 | −2 |
| 31 | −75 | 650 | 10 | +10 |

In the Permalloy layer of Sample No. 29 slight cracks were locally detected. Sample Nos. 30 and 31 were free of cracks and exhibited a small degree of curl.

We claim:

1. A perpendicular magnetic recording medium formed on a base and comprising an hcp cobalt alloy layer having opposed major surfaces and comprising mainly cobalt and additionally chromium, said layer having a direction of easy magnetization in a direction normal to the base, characterized in that the cobalt alloy layer is composed of particles, with a boundary between the particles forming a non-columnar pattern extending between said surfaces of said cobalt alloy layer, as seen in a cross section of the layer observed with a scanning electron microscope, thereby providing said cobalt alloy layer with a homogeneous cross sectional structure.

2. A perpendicular magnetic recording medium according to claim 1, wherein said base is a polyester film.

3. A perpendicular magnetic recording medium according to claim 1, further comprising a layer of soft magnetic metal.

4. A perpendicular magnetic recording medium according to claim 2 or 3, wherein the degree of curl (Kp), which is expressed by:

$$Kp = \frac{h_1 + h_2}{2l_0} \times 100 \, (\%)$$

is not more than 15%, the symbol "$l_0$" indicating the length of a specimen of said medium without curl and the symbols "$h_1$" and "$h_2$" indicating the deviation of a specimen with curl for both ends of the specimen without curl.

5. A perpendicular magnetic recording medium according to claim 1, wherein said particle pattern substantially conforms to FIG. 10 of the accompanying drawing.

6. A perpendicular magnetic recording medium according to claim 1, wherein said particle pattern substantially conforms to FIG. 12 of the accompanying drawing.

7. A perpendicular magnetic recording medium according to claim 1, wherein said particle pattern substantially conforms to FIG. 13 of the accompanying drawing.

* * * * *